Dec. 8, 1964    G. RISKE ETAL    3,160,230
LUBRICATOR
Filed June 21, 1962

INVENTORS
GILBERT RISKE
& JOHN B. RITZEMA
BY
Mason, Porter, Diller & Stewart
ATTORNEYS United States Patent Office 3,160,230
Patented Dec. 8, 1964

3,160,230
LUBRICATOR
Gilbert Riske, Canoga Park, Calif., and John B. Ritzema, Des Plaines, Ill., assignors to Parker-Hannifin Corporation, Cleveland, Ohio, a corporation of Ohio
Filed June 21, 1962, Ser. No. 204,149
15 Claims. (Cl. 184—55)

This invention relates in general to new and useful improvements in airline lubricators, and more particularly to an airline lubricator of the type provided with means for supplying air passing therethrough with a lubricant from a remote pressurized source.

The customary airline lubricator includes a housing with a main passage for air and a reservoir for lubricant attached thereto, the reservoir being detachable from the housing so that it may be refilled when empty. Air under pressure from the main passage is communicated to the reservoir to force oil through a pickup tube having an opening near the bottom of the reservoir to a point within the main passage. Such lubricators must necessarily be mounted with the reservoir in a lowermost position so that the opening in the pickup tube will be submerged in the lubricant.

Airline lubricators of the type just described are satisfactory for many installations. However, there are times when it is inconvenient or impossible to install the lubricator with the reservoir lowermost. Also, it may be necessary to install the lubricator at out-of-reach of other locations where access to the reservoir for refilling the same is difficult or inconvenient.

With these and other considerations in view, it is an object of the present invention to provide an airline lubricator in which the reservoir for the lubricant may be located remote from the lubricator housing.

Another object is to be able to mount the lubricator housing in any position without affecting operation thereof.

Another object is to provide an airline lubricator in which oil under pressure from a remote source is delivered to the lubricator housing and there being a means for automatically regulating the amount of oil metered into the airstream according to the differential of the air pressure in the housing inlet and outlet, and with the oil feed being automatically shut off when air ceases to flow through the housing.

Another object of this invention is to provide a novel attachment for an airline lubricator, which attachment is adapted to replace the usual reservoir of an airline lubricator, with the attachment being adapted to control the supply of lubricant from a remote pressurized lubricant source, the attachment being constructed for use with existing airline lubricator housings.

Another object of this invention is to provide a novel attachment for use with existing airline lubricator housings for replacing usual lubricant reservoirs thereof, the attachment being particularly adapted for supplying lubricant from a pressurized source, and the attachment including a body having mounted therein a diaphragm type actuator with the body being provided with suitable passages for applying pressures to opposite sides therefrom from the housing, with the pressures being different to effect the movement of the diaphragm type actuator in response to air flowing through the housing, the body further including a lubricant inlet passage and a control valve for controlling the flow of lubricant through the body to the housing for distribution into air passing through the housing, the diaphragm type actuator controlling the actuation of the control valve, whereby lubricant is supplied through the attachment to the air flowing through the housing only during the flow of air through the housing.

A further object of this invention is to provide a novel airline lubricator which includes a conventional housing structure having an air passage therethrough and including an inlet end and an outlet end, a valve disposed within the air passage in the housing for controlling the flow of air therethrough and thereby effecting a pressure differential between the inlet end and the outlet end, the housing having an outwardly opening chamber and passage means connecting the inlet end of the air passage through the chamber, the housing also having a lubricant supply tube and passage means connecting the lubricant supply tube to the outlet end of the air passage, and a novel attachment releasably secured to the housing in a conventional manner with the attachment including a body having a diaphragm type actuator therein, and an air inlet passage opening to one side of the diaphragm of the actuator and opening into the chamber, whereby pressure at the inlet end of the air passage of the housing is effective on one side of the diaphragm, the body also including a lubricant discharge passage which receives and is sealed to the lubricant supply tube, the lubricant discharge passage opening to the opposite side of the diaphragm whereby there is a pressure differential on opposite sides of the diaphragm in accordance with the pressure differential at the inlet end and outlet end of the air passage of the housing, the body also including a lubricant supply fitting for receiving lubricant from a pressurized lubricant source, and a control valve controlling the flow of lubricant from the lubricant supply to the lubricant discharge passage, the control valve being connected to the diaphragm actuator for operation thereby in response to flow of air through the airline lubricator.

With the above and other objects in view that will hereinafter appear, the nature of the invention will be more clearly understood by reference to the following detailed description, the appended claims and the several views illustrated in the accompanying drawing.

Figure 1:
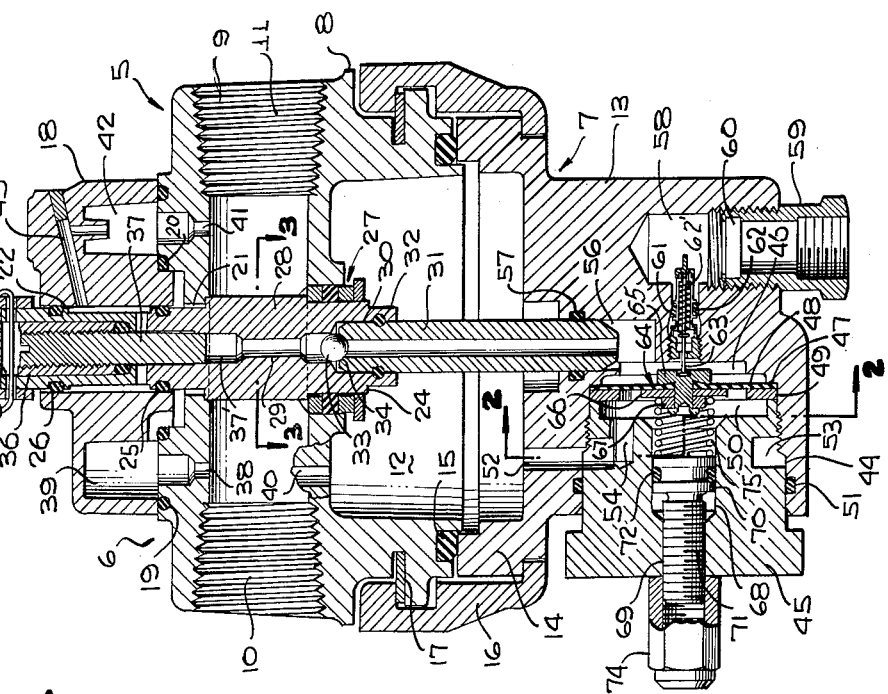
FIGURE 1 is a vertical sectional view taken through the airline lubricator and shows the specific details thereof.

Referring now to the drawing in detail, it will be seen that there is illustrated in FIGURE 1 an airline lubricator formed in accordance with this invention, the airline lubricator being referred to in general by the reference numeral 5. The airline lubricator 5 is primarily of a two-piece construction, and includes an air supply structure generally designated 6, and an attachment generally referred to by the numeral 7. The air supply structure 6 is of conventional type and only those portions thereof necessary to understand the purpose and operation of the attachment 7 will be described here.

The air supply structure 6 includes a housing 8 having an air passage 9 extending therethrough. The air passage 9 has an inlet end 10 and an outlet end 11 which are adapted to be connected in an airline. In accordance with the invention, air will flow through the air passage 9 from left to right, as viewed in FIGURE 1, and lubricant will be supplied to such air as it flows through the housing 8.

The housing 8 includes a lower portion defining a chamber 12. The lower end of the chamber 12 is closed by the attachment 7 which includes a body 13 having an upper attaching flange 14. The lower portion of the housing 8 is provided with a sealing ring 15 which is engaged by the attaching flange 14 so as to form a seal between the body 13 and the housing 8. The flange 14 is clamped against the sealing ring 15 by means of a coupling ring 16 carried by the body 13 and releasably secured to the lower portion of the housing 8 by means of a releasable locking ring 17 which, when rotated to selected positions in a known manner, will release or retain the coupling ring 16.

The air supply structure 6 also includes a cap 18 mounted on the top of the housing 8 and sealed thereto by packing portions 19 and 20. The housing 8 has a vertical bore 21 therethrough which is aligned with a vertical bore 22 through the cap 18. A valve unit, generally referred to by the numeral 23, is mounted within the bores 21 and 22.

The valve unit 23 includes a valve body 24 which extends through the bores 21 and 22 is sealed relative to the cap 18 by means of O-rings 25 and 26. The valve member 24 is frictionally clamped within the housing 8 in sealed relation to the bore 21 by means of a combined clamped and seal assembly, generally referred to by the numeral 27. Since the combined clamp and seal assembly 27 does not in itself form a part of this invention, it will not be described in more detail.

Figure 3:
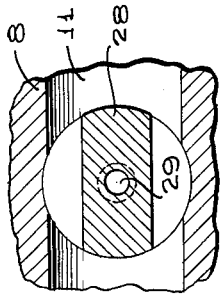
FIGURE 3 is a fragmentary horizontal sectional view taken along the line 3—3 of FIGURE 1, and shows the general details of the valve for effecting a pressure differential at opposite ends of the air passes through the housing of the airline lubricator.
Figure 2:
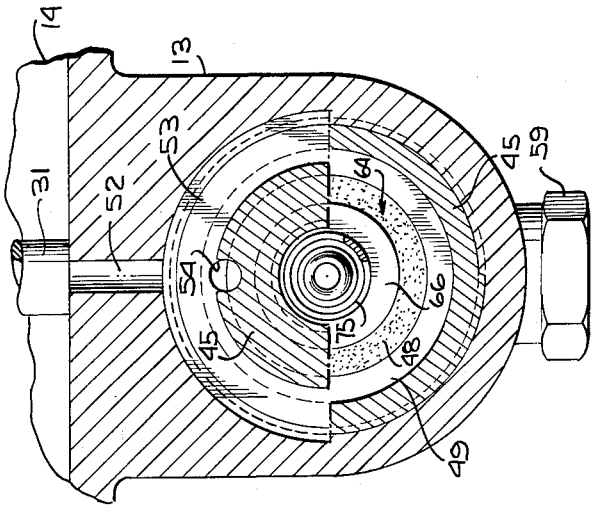
FIGURE 2 is a fragmentary enlarged vertical sectional view taken along the line 2—2 of FIGURE 1, and shows further the specific details of the attachment of the airline lubricator.

The valve body 24, as is best shown in FIGURE 3, has an intermediate valve defining portion 28 located within the air passage 9 for controlling the flow of air therethrough. It will be readily apparent that the valve portion 28 impedes the flow of air through the air passage 9 so that there is a differential in pressure at the inlet end 10 and the outlet end 11 of the air passage 9. It is upon this differential in air pressure that the lubricator 5 depends for its function. The differential in air pressure can be controlled by controlling the position of the valve portion 28. In other forms of the invention the valve 24 may be omitted and replaced by a fixed restriction in air passage 9 or some other means for effecting a pressure drop between inlet 10 and outlet 11.

The valve member 24 has a bore 29 therethrough which terminates at the lower end thereof in an enlarged bore 30. An upper end of a lubricant supply tube 31 is disposed within the bore 30 and is retained therein in sealed relation by means of an O-ring 32. A ball check valve 33 is disposed above the tube 31 and cooperates with a valve 34 at the upper end of the tube 31 for preventing the return flow of lubricant through the tube 31. Upward movement of the check valve 33 is restricted by the reduced cross-section of the bore 29.

The upper part of the valve member 24 is provided with an enlarged bore 35 in which there is positioned an internally threaded bushing 36. A needle valve 37 is threaded in the bushing 36 and cooperates with an upper portion 37' of the bore 29 to control the volume of lubricant flow through the bore 29.

The housing 8 is provided with an air passage 38 which opens from the inlet end of the air passage 9 into a chamber 39 in the cap 18. The chamber 39 is placed in communication with the chamber 12 through a plurality of air passages which will be collectively referred to by the numeral 40. The air passages 40 may be controlled by suitable valve means (not shown) which are not a part of this invention and which, for the description of the operation of the invention, are not required. In this manner, the chamber 12 is supplied with air at a pressure substantially equal to the pressure of air passing through the air passage 9 at the inlet end 10 thereof.

The housing 8 is provided with a passage 41 which opens into the air passage 9 adjacent the outlet end 11 thereof. The passage 41 is in communication with a chamber 42 in the cap 18 which chamber 42 is, in turn, placed in communication with the bore 29 and the tube 31 by passage means collectively referred to by the numeral 43. In this manner, lubricant is supplied through the tube 31 to air as it passes out of the outlet end of the air passage 9. By the same token, the pressure within the tube 31 corresponds closely to the pressure of air passing out of the air passage 9 at the outlet end thereof. Thus, there is a differential between the pressure in the chamber 12 and the pressure within the tube 31.

It is to be understood that the air supply structure 6 is conventional as far as this invention is concerned, and in lieu of the attachment 7, the air supply structure 6 could be provided with a lubricant reservoir, with the lubricant within the lubricant reservoir pressurized by the air pressure within the chamber 12, and the lubricant forced up through the tube 31. Of course, the tube 31 would have a length corresponding to the depth of the reservoir. Accordingly, further description of the air supply structure 6 is not believed necessary.

The body 13 is provided with a transverse bore 44 in which there is removably threaded a plug 45. The bore 44 has an inner end portion defining a chamber 46 and a shoulder 47. A diaphragm 48 is clamped against the shoulder 47 to close the left end of the chamber 46, as viewed in FIGURE 1. A clamp ring 49 bears against the left side of the diaphragm 48 and is brought into pressure engagement with the diaphragm 48 by the plug 45. The inner end of the plug 45 is recessed to define a chamber 50 which is disposed on the left side of the diaphragm 48 in opposition to the chamber 46. The plug 45 is sealed with respect to the body 13 by means of an O-ring 51.

The upper part of the body 13 is provided with an air inlet passage 52 which opens into the chamber 12 for receiving air under pressure therefrom. The plug 45 has an annular passage 53 which is aligned with the air inlet passage 52. The plug 45 further has a passage 54 extending from the passage 53 into the chamber 50 so that the chamber 50 may contain air at the same pressure as the air within the chamber 12.

The body 13 also has a centrally located bore which defines a lubricant discharge passage 56. The bore or lubricant discharge passage 56 has the lower end thereof in communication with the chamber 46 and the upper end thereof in communication with the chamber 42. The lubricant discharge passage 56 receives the lower end of the tube 31, and an O-ring 57 forms a seal between the body 13 and the tube 31. In this manner, the pressure within the chamber 46 is substantially the same as that within the tube 31 and air outlet passage 9.

The body 13 also is provided with a lubricant supply passage 58 which has threaded thereinto a fitting 59 adapted to be connected to a lubricant supply line (not shown) through which lubricant under pressure may be supplied from a remote source to the lubricant inlet passage 58. The fitting 59 is preferably provided with a suitable filter 60.

A passage 61 extends between the lubricant inlet passage 58 and the chamber 46. A control valve 62 is disposed within the passage 61 for controlling the flow of lubricant therethrough. The control valve 62 is of the spring loaded check valve type and may be a conventional tire valve. The control valve 62 has a valve plunger 63 which must be pushed into the body of the valve to effect the opening thereof against spring 62'.

The diaphragm 48 forms part of an actuator for the control valve 62, the actuator being generally referred to by the numeral 64. In addition to the diaphragm 48, the actuator 64 includes a plunger 65 which is located centrally of the diaphragm 48 and which receives the plunger 63. A pair of washers 66 and 67 clamp the diaphragm 48 to the plunger 65.

The plug 45 has an inner bore 68 which opens into the chamber 50 at one end and into a threaded bore 69 at the other end thereof. A spring loading plunger 70 is mounted within the bore 68 and has a threaded stem 71 threaded in the bore 69. The plunger 70 is provided with an O-ring 72 for forming a seal with the plug 45.

A lock nut 74 is threaded on the outer end of the stem 71.

A spring 75 is disposed in the inner end of the bore 68 and bears against the washer 66, the inner end of the spring 75 surrounding the washer 67 and being guided thereby. The inner end of the plunger 70 bears against the outer end of the spring 75 and by adjusting the position of the plunger 70 within the bore 68, the tension of the spring 75 may be varied. In this manner, the actuator 64 is adjusted.

It is to be understood that the pressure of lubricant supplied to the body 13 through the fitting 59 will be in excess of the pressure of air passing through the air passage 9 of the housing 8. However, normally, the pressure of the lubricant has only a negligible effect on the operation of valve 62 by actuator 64. Thus, the control valve 62 is controlled by the actuator 64 through the differential in pressures at the inlet and outlet ends of the air passage 9. When air is flowing through the air passage 9, the differential in pressure will cause the diaphragm 48 to move to the right, with the result that the actuator 64 will function to open the control valve 62. Lubricant under pressure will immediately flow through the control valve 62 into the chamber 46, and from the chamber 46 through the lubricant discharge passage 56 into the tube 31 and through passages 29, 43 and 41 for delivery to the air passing through the air passage 9. When the valve 62 is thus opened, it will maintain an open position such that the force on the one side of diaphragm 48 provided by spring 75 and fluid pressure in chamber 50 is balanced by the force on the other side of the diaphragm provided by spring 62' and fluid pressure within chamber 46. Since the fluid pressures within chambers 50 and 46 are substantially the same as those in inlet 10 and outlet 11 respectively, the amount of opening of valve 62, and hence the amount of oil delivered to outlet 11, for a given pressure in inlet 10 can be varied by changing the pressure drop between inlet 10 and outlet 11. This is accomplished by turning valve member 28.

With valve 28 at any desired setting the flow of lubricant will automatically increase with an increase of pressure at inlet 10, and vice versa. Thus an increase in pressure at inlet 10 will result in faster air flow through passage 9 and an increase in the pressure differential between inlet 10 and outlet 11 with a corresponding increase in the pressure differential in chambers 50 and 46. This will cause valve 62 to open wider to permit greater flow of oil therethrough.

It is to be understood that when there is no air flow through the air passage 9, there will be no differential in pressures at the opposite ends of the air passage 9, with the result that the actuator 64 will remain in a position which permits spring 62' to maintain control valve 62 closed. Thus, until there is a flow of air through the air passage 9, there will be no supplying of lubricant through the attachment 7 to the air supply structure 6.

In view of the fact that the airline lubricator 5 is not provided with a bulk supply of lubricant and all of the lubricant flow therethrough is under pressure, it will be readily apparent that the airline lubricator 5 may be mounted in any desired position. Accordingly, while reference has been made to top and bottom in describing the airline lubricator 5, this is only applicable when the airline lubricator 5 is positioned in the manner illustrated in FIGURE 1. The airline lubricator 5, due to the construction of the attachment 7, may be mounted in an inverted position from that shown in FIGURE 1, or one turned at right angles thereto, for example.

Although only a preferred embodiment of the invention has been illustrated and described, it is to be understood that many modifications may be made in the structure of the attachment within the spirit and scope of the invention, as defined in the appended claims.

We claim:

1. An airline lubricator comprising a housing having a passageway for air therethrough, said passageway including an inlet and an outlet, means for creating a pressure differential between said inlet and said outlet, passage means for supplying a lubricant under pressure to said outlet, and control means having opposite sides thereof respectively exposed to pressure fluid in said inlet and said outlet and directly responsive to the pressure differential between inlet and outlet pressures for metering lubricant through said passage means to said outlet.

2. An airline lubricator in accordance with claim 1 in which there is a means for varying the pressure differential between said inlet and said outlet and said control means is responsive to said variations for correspondingly varying the amount of lubricant metered through said passage means and a spring acting on the control means for augmenting the force applied thereto by the inlet fluid pressure.

3. An airline lubricator in accordance with claim 2 in which said control means includes a means for adjusting the amount of lubricant metered through said passage means in response to a given pressure differential between said inlet and outlet and means for adjusting the force exerted on said control means by said spring.

4. An airline lubricator comprising a housing having an air passage therethrough with an inlet and an outlet, a first chamber communicating with said inlet, a second chamber communicating with said outlet, means for effecting a differential in pressures between said inlet and outlet whereby there is a differential in pressures between said chambers, said chambers having a common wall therebetween, said wall being movable by differentials of pressures between said chambers, a lubricant supply passage in said housing leading to said second chamber, and a control valve operable by said movable wall for controlling the flow of lubricant from said supply passage through said second chamber to said air passage outlet.

5. The airline lubricator of claim 4 wherein said control valve is a spring loaded check valve.

6. The airline lubricator of claim 4 wherein said movable wall is in the form of a flexible diaphragm.

7. The airline lubricator of claim 4 wherein said control valve is of the spring loaded check valve type, and said movable wall is in the form of a spring loaded diaphragm with the spring of the diaphragm opposing the spring of said check valve.

8. The airline lubricator of claim 4 wherein said movable wall is in the form of a diaphragm, and a plug removably clamps said diaphragm in said housing.

9. The airline lubricator of claim 4 wherein said movable wall is in the form of a diaphragm, a plug removably clamps said diaphragm in said housing, a spring carried by said plug biases said diaphragm toward said second chamber, and there is an adjustable plunger carried by said plug for adjusting the tension of said spring.

10. An airline lubricator comprising a housing having an air passage therethrough, means for effecting a pressure differential in air flowing through said passage between the inlet and outlet ends thereof, a lubricant supply attachment secured to said housing, said attachment including a body having a first chamber communicating with said inlet end and a second chamber communicating with said outlet end by means including a tube having a sealed relation with said housing and said body whereby there is a differential in pressures between said chambers, said chambers having a common wall therebetween, said wall being movable by pressure differentials between said chambers, a lubricant supply passage in said body leading to said second chamber, a control valve operable by said movable wall for controlling the flow of lubricant from said supply passage to said second chamber.

11. A lubricant supplying attachment for an airline lubricator of the type including a housing having an air passage therethrough wherein the pressure differential between the opposite ends of the air passage is relied upon to effect the supplying of lubricant to air passing through the air passage; said attachment comprising a body having means whereby it may be secured to the airline lubricator housing, said body having an air inlet passage connected with the inlet end of said air passage and having a lubricant discharge passage connected with the outlet end of said air passage, an actuator of the pressure differential type disposed intermediate said inlet passage and said discharge passage and separating these passages in sealed relation thereto and movable in response to differentials of pressure therein, a lubricant supply passage in said attachment body for delivering lubricant under pressure to said lubricant discharge passage, a control valve disposed intermediate said lubricant supply passage and said lubricant discharge passage for controlling the flow of lubricant, and means connecting said actuator to said control valve for operating the same in response to said pressure differentials in said inlet passage and said discharge passage.

12. The attachment of claim 11 wherein said control valve is of the spring loaded check valve type.

13. The attachment of claim 11 wherein said actuator is in the form of a diaphragm.

14. The attachment of claim 11 wherein said control valve is of the spring loaded check valve type, and said actuator is in the form of a spring loaded diaphragm with the spring of the diaphragm opposing the spring of said check valve.

15. The attachment of claim 11 in which there is a means for varying the amount of lubricant permitted to flow by said control valve in response to a given differential in pressure between said inlet passage and said discharge passage.

References Cited in the file of this patent
UNITED STATES PATENTS

| | | |
|---|---|---|
| 2,735,512 | Faust | Feb. 21, 1956 |
| 2,854,991 | Webster | Oct. 7, 1958 |
| 2,925,148 | Mosher | Feb. 16, 1960 |